Figure 1:
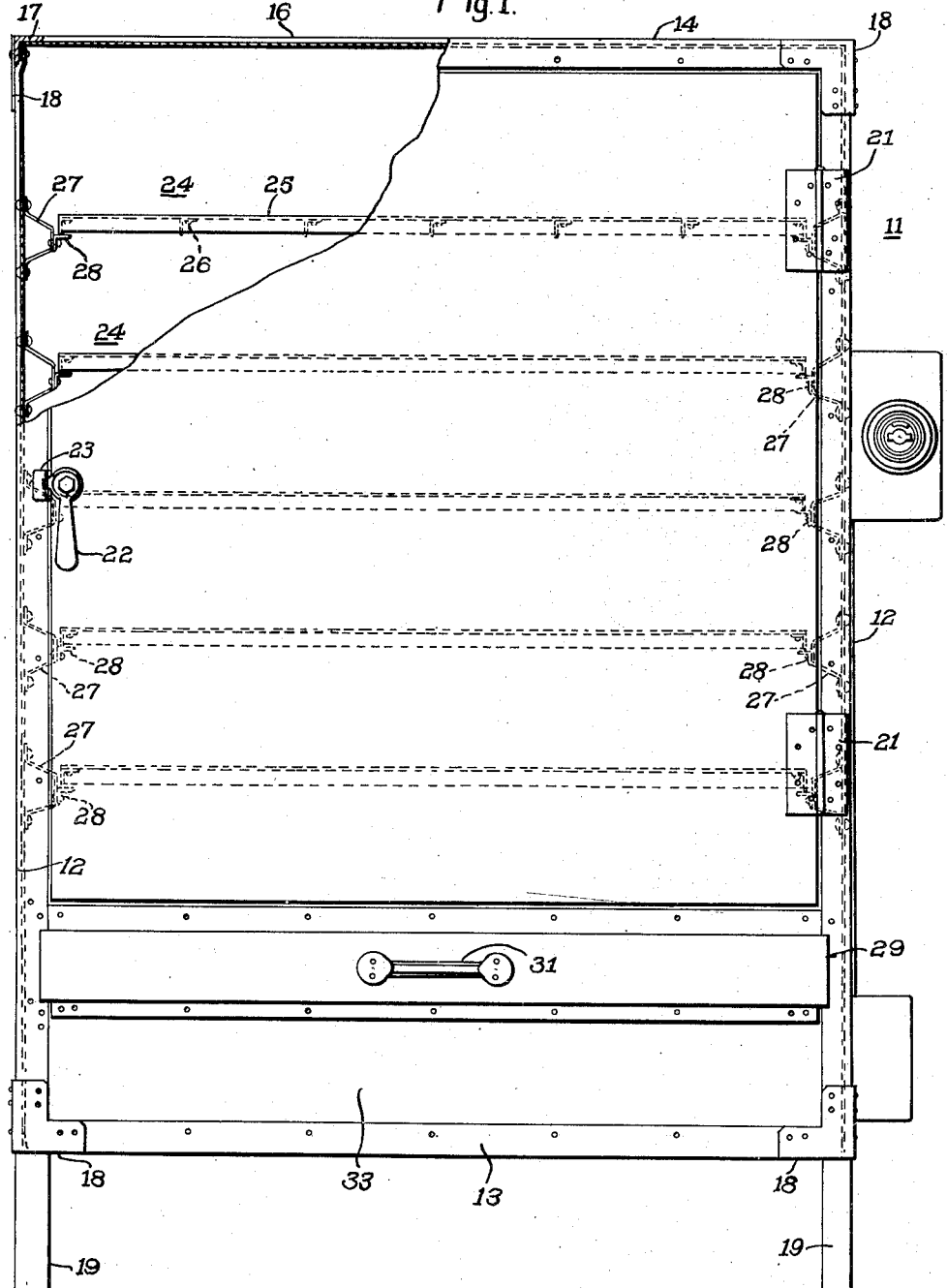

Sept. 29, 1925.

J. C. WOODSON

DOUGH PROOFING OVEN

Filed May 28, 1923

1,555,321

3 Sheets-Sheet 3

WITNESSES:

INVENTOR
James C. Woodson.
BY
ATTORNEY

Patented Sept. 29, 1925.

1,555,321

UNITED STATES PATENT OFFICE.

JAMES C. WOODSON, OF EAST PITTSBURGH, PENNSYLVANIA, ASSIGNOR TO WESTINGHOUSE ELECTRIC & MANUFACTURING COMPANY, A CORPORATION OF PENNSYLVANIA.

DOUGHPROOFING OVEN.

Application filed May 28, 1923. Serial No. 641,852.

*To all whom it may concern:*

Be it known that I, JAMES C. WOODSON, a citizen of the United States, and a resident of East Pittsburgh, in the county of Allegheny and State of Pennsylvania, have invented a new and useful Improvement in Doughproofing Ovens, of which the following is a specification.

My invention relates to ovens and particularly to dough-proofing ovens.

The object of my invention is to provide a relatively simple oven structure for proofing dough that shall embody electrical means for providing both heat and moist vapor and that shall embody electrically-actuated temperature controlling means for the oven.

In practicing my invention, I provide a sheet metal casing within which are located a plurality of spaced and superposed trays on which the pans containing the dough may be placed. A plurality of relatively thin, flat, elongated heating elements are located in parallel spaced relation in the lower part of the oven and a relatively shallow tray or pan is removably located thereon and a perforated baffle plate is located immediately above the pan.

A thermostat is so located in the structure as to be subjected to and influenced by, the temperature of the oven chamber and controls a circuit interrupter to selectively energize the heating elements to maintain a substantially constant temperature in the oven chamber.

Figure 2:
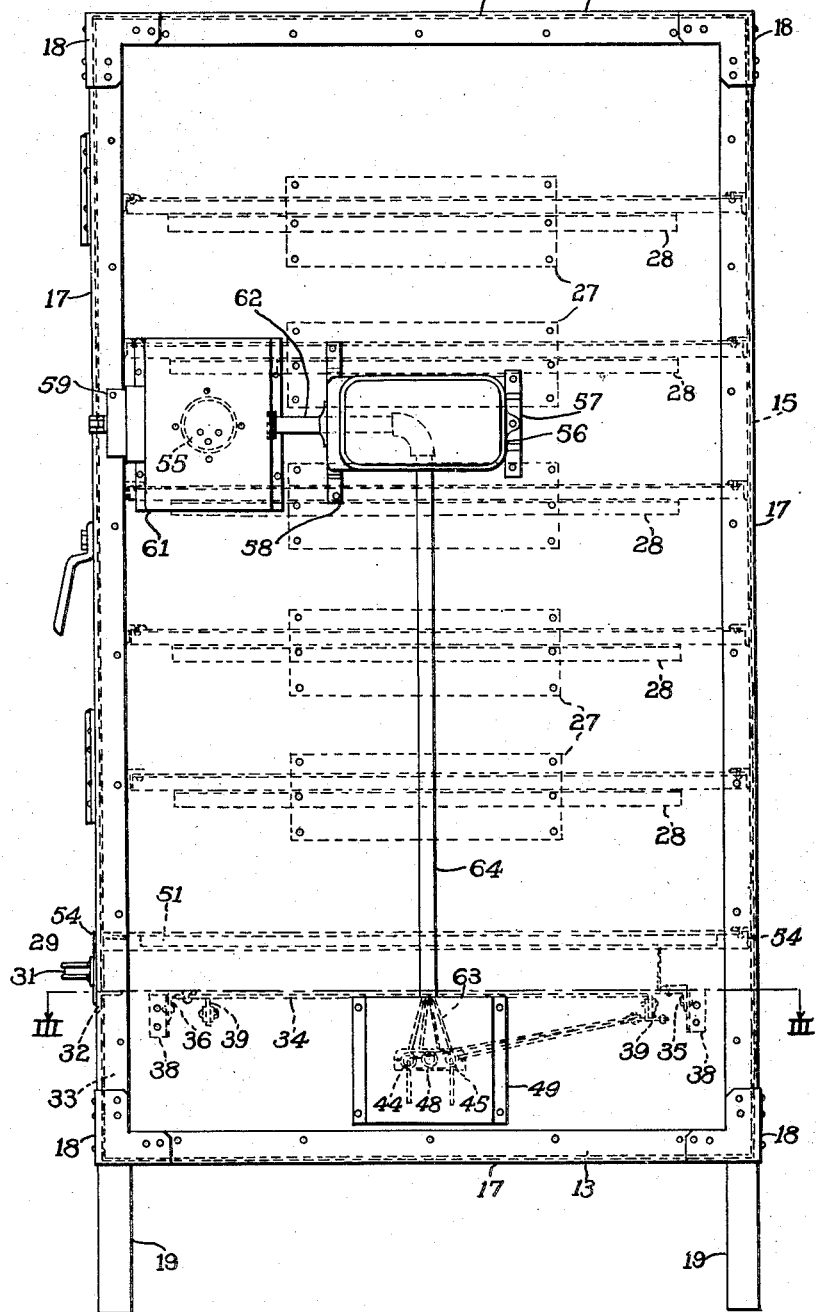
Figure 3:
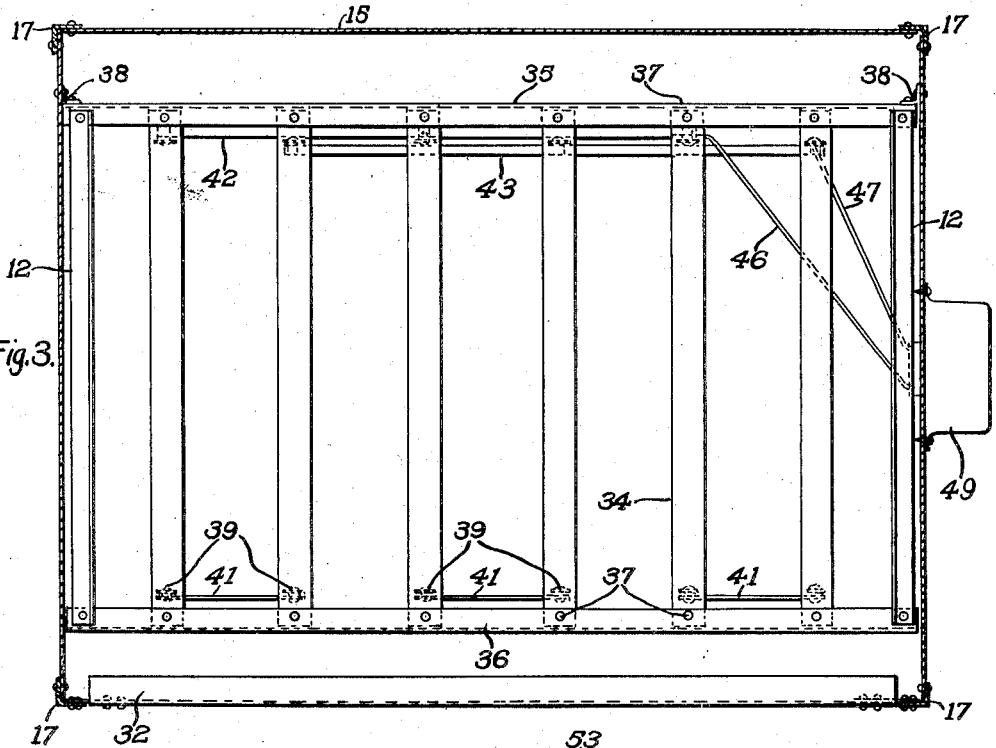
Figure 4:
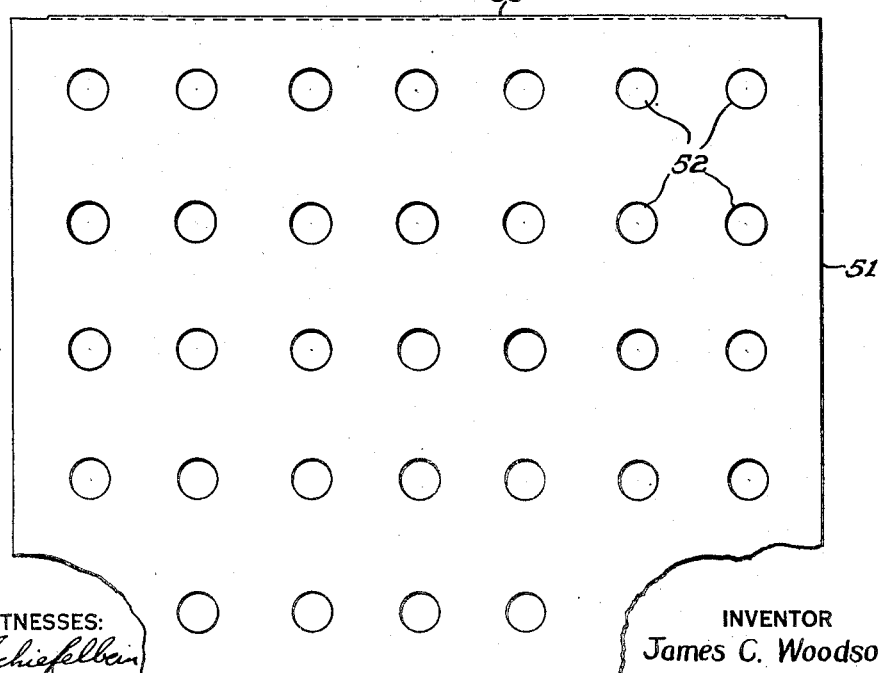

In the drawings,

Figure 1 is a view, in front elevation, of an oven embodying my invention, a part of the front thereof being shown broken away to illustrate the internal construction thereof, Fig. 2 is a view, in side elevation, thereof, Fig. 3 is a view, in horizontal section, of the oven illustrated in Fig. 1, taken on the line III—III thereof, and Fig. 4 is a top plan view of a baffle plate comprising a part of the device embodying my invention.

An oven 11 comprises a pair of side walls 12, a bottom wall 13, top wall 14, a rear wall 15 and a front door 16. The bottom, side, rear and top walls are respectively constituted by sheet metal plates that are suitably connected together at their edges by angle bar members 17 at the four corners thereof and also at the top and the bottom edges. Gusset plates 18 are provided at each of the corners to secure the adjacent ends of the plates together and to hold them securely in their proper operative positions relatively to each other. A plurality of supporting members 19 for the oven may be constituted by integral extensions of the vertical angle bar members 17.

While I have illustrated a particular method of, and means for, mechanically connecting the sheet metal panels constituting the bottom, sides, back and top of the oven, I do not desire to be restricted thereto, as any suitable means usually employed in the art may be used.

A pair of hinge members 21 are suitably secured to one of the vertically extending front angle bar members 17 and the door panel 16 is mounted thereon. A locking handle 22 is provided at the side of the panel 16 opposite to that at which the hinges 21 are located, and co-operates with a suitable catch 23 to hold the door in its closed position.

Means for holding a plurality of pans containing the dough to be proofed in the oven chamber may comprise a plurality of superposed trays 24 each of which comprises a sheet metal member 25 that is, in turn, provided with stiffening members 26 in the form of small angle bars suitably secured to the under surface thereof. The trays can be easily and quickly removed if necessary for purposes of inspection or cleaning.

A plurality of supporting means for the reception of the trays 24 may comprise members 27, of substantially U-shape, the ends of which are secured to the side walls 12 in superposed spaced relation. Angle bar supports 28 are secured to each of the members 27 and the trays or shelves 24 rest directly upon the members 28.

The door panel 16 does not extend the entire height of the oven as the lower portion of the oven chamber proper is not used for receiving pans of dough. A removable relatively shallow pan 29 having a handle member 31 secured to the front thereof, is located immediately below the compartment of the oven chamber in which the dough is placed and is filled with water preparatory to the operation of the oven.

An angle bar member 32 is secured to a relatively narrow front panel 33 that is located at the front of the bottom compartment of the oven chamber hereinbefore described in order that a metal member of sufficient horizontal width may be provided to support the pan 29 when the same is slid in and out, as required.

A plurality of relatively thin, flat, elongated heating elements 34 are located in the lower portion of the oven chamber in what may be termed the heating compartment thereof and are of the so-called space heater type. This type of heating element comprises an outer sheet metal casing bent around an insulated resistor member and provided with suitable terminals. While I have illustrated a specific embodiment of heater, I do not desire to be limited thereto, as any suitable or desired heating element may be employed.

Means for supporting the elongated heating elements 34 may comprise laterally extending angle bar members 35 and 36 located such distance apart as will permit of securing the heating elements 34 thereto, by suitable machine screws 37 at each end thereof. The angle bar members 35 and 36 are secured to the respective side panels 12 by angle bar members 38. The location of the heating elements and of the angle bar member 32 is such as to cause the heating elements to be located closely adjacent to and supporting the pan 29 in order that the heating elements, when energized, may be permitted to easily and quickly give up their heat to the bottom of the pan 29 and therefore, to the water contained therein.

The terminal members 39 of the respective heating elements may be electrically connected by suitable bus bars 41 in series circuit relation relatively to each other and by other bus bars 42 and 43 in parallel circuit relation relatively to each other. This permits of using two 110 volt resistor members in series on a 220 volt energizing circuit and of connecting any desired number of pairs in parallel. The bus bars 42 and 43 are electrically connected to terminal members 44 and 45, by bus bars 46 and 47. The terminal members 44 and 45 are located at the side of the oven structure in a suitable electric insulating block 48 of refractory material, a cover member 49 being provided to suitably protect the terminal members.

A baffle plate 51 is located immediately above the pan 29 and comprises a sheet metal plate having a plurality of symmetrically spaced perforations 52 therein. Two opposite edges of the plate 51 are provided with integral depending flange portions 53 to stiffen the plate which is supported in the oven structure by angle bar members 54.

Means for maintaining a substantially constant temperature within the oven chamber comprises a thermostatic member 55 that projects into the oven chamber through a suitable opening in one of the side walls 12. This thermostatic member may be of the type disclosed and claimed in a copending application of B. H. Smith, Serial No. 439,409, filed January 24, 1921, and assigned to the Westinghouse Electric & Manufacturing Company.

The thermostatic means 55 actuates a motor-operated snap switch 56 that is mounted at the side of the oven structure on suitable brackets 57 and 58. This device is more particularly disclosed and claimed in a co-pending application, by E. W. Denman and R. A. Balze, Serial No. 328,032 filed October 2, 1919, and assigned to the Westinghouse Electric & Manufacturing Company. A snap switch 59 is mounted on the front of a casing 61 that serves also to cover the thermostat 55, the switch 59 permitting of manually controlling the energization of the heating elements 34 whenever desired. A conduit 62 is provided, within which the control wiring from the thermostat to the motor-operated snap switch may be located and within which the supply circuit conductors 63 extending from the terminals 44 and 45 may be located, a conduit 64 being provided to carry these conductors from the casing 49 to the conduit 62.

When it is desired to proof a quantity of dough, the pans filled therewith are placed on the trays in the oven chamber and the heating elements 34 are permitted to be energized by suitable operation of the snap switch 59. The immediate effect of the energization of the heating elements is a heating of the water placed in the pan 29, producing a heated moist vapor that ascends through the openings 52 in the baffle plate 51, is substantially uniformly distributed thereby and comes in contact with the dough in the respective pans.

It has heretofore been customary to heat the chamber of a dough-proofing oven by any suitable means, such as by steam piping or by gas, and provide a conduit or conduits projecting into the oven chamber to permit of introducing therein live steam to provide the heated moist vapor.

The device embodying my invention provides both heat and a moist vapor without the necessity of providing two separate means therefor. When the temperature of the moist heated vapor in the oven chamber has reached, a predetermined value, the thermostatic means operates to actuate the motor-operated snap switch to de-energize the heating elements and thereafter the temperature within the oven chamber is maintained within predetermined limits, depending entirely upon the setting of the thermostatic means.

The device embodying my invention thus provides a single relatively simple means for providing a heated moist vapor in a dough-proofing oven and further provides a thermostatic means for maintaining the temperature within predetermined limits at substantially any predetermined value.

Various modifications in detail and arrangement may be made without departing from the spirit and scope of my invention, and such modifications are intended to be covered by the appended claims.

I claim as my invention:

1. A dough-proofing means comprising a casing, a plurality of supports in said casing upon which dough to be proofed may be placed, a fluid container in said casing and electric heating means supporting said fluid container and effective to transform a fluid therein into a vapor constituting the sole vehicle of heat in said casing.

2. A dough-proofing means comprising a casing enclosing a chamber, a plurality of dough-supporting means in said casing, said supporting means being of relatively less area than said chamber, a fluid container in said casing, electric heating means supporting said fluid container and effective to change a fluid therein into a heated vapor constituting the sole vehicle of heat in said casing, and a baffle plate above said container for ensuring a substantially uniform distribution of said heated vapor in said casing.

3. A dough-proofing means comprising a casing enclosing a chamber, a plurality of spaced dough-supporting means in said casing, said supporting means being of relatively less area than said chamber, a plurality of electric heating elements in the lower part of said chamber, and a fluid container supported by said heating elements and directly energized thereby for producing heated, moist air in said chamber.

4. A dough-proofing means comprising a casing enclosing a chamber, a plurality of spaced dough-supporting means in said casing, said supporting means being of relatively less area than said chamber, a plurality of electric heating elements in the lower part of said chamber, a fluid container supported by said heating elements for providing heated, moist air in said chamber, and a baffle plate above said container for effecting substantially uniform distribution of said moist air above said container.

In testimony whereof, I have hereunto subscribed my name this 25th day of May, 1923.

JAMES C. WOODSON.